United States Patent
Manczak et al.

(10) Patent No.: US 7,805,409 B2
(45) Date of Patent: Sep. 28, 2010

(54) DYNAMIC COMPOSITION OF AN EXECUTION ENVIRONMENT FROM MULTIPLE IMMUTABLE FILE SYSTEM IMAGES

(75) Inventors: Olaf Manczak, Hayward, CA (US); Christopher A. Vick, San Jose, CA (US); Michael H. Paleczny, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 373 days.

(21) Appl. No.: 12/035,132

(22) Filed: Feb. 21, 2008

(65) Prior Publication Data

US 2009/0216811 A1     Aug. 27, 2009

(51) Int. Cl.
    *G06F 17/30*      (2006.01)
(52) U.S. Cl. ........................................ 707/638
(58) Field of Classification Search ............ 707/638
See application file for complete search history.

(56) References Cited

U.S. PATENT DOCUMENTS

| | | | |
|---|---|---|---|
| 2004/0194082 A1* | 9/2004 | Purkeypile et al. | 717/174 |
| 2005/0034118 A1* | 2/2005 | Raman et al. | 717/174 |
| 2005/0066134 A1* | 3/2005 | Tormasov et al. | 711/151 |
| 2009/0007105 A1* | 1/2009 | Fries et al. | 718/1 |

OTHER PUBLICATIONS

Blankenhorn, OpenNTPD, 2004 (accessed Apr. 22, 2010).*
Wikipedia, OpenWRT, 2007 (accessed Apr. 22, 2010).*

* cited by examiner

*Primary Examiner*—James Trujillo
*Assistant Examiner*—William Spieler
(74) *Attorney, Agent, or Firm*—Marsh Fischmann & Breyfogle LLP; Kent A. Lembke; Michael Martensen (57) ABSTRACT

A virtual file system is formed configured to enable the dynamic composition of immutable file system images. A file system containing a software distribution is divided into a plurality of mutually exclusive sub-trees. Each sub-tree includes a portion of the software distribution. An immutable file system image is formed for each sub-tree. During the booting of an operating system, a virtualization engine intercedes in the boot process to mount the immutable file system images to independent directories of the root file system. Upon request the virtualization engine, during run-time, combines virtual entries corresponding to immutable file system images so as to resemble the original software distribution.

13 Claims, 4 Drawing Sheets

DYNAMIC COMPOSITION OF AN EXECUTION ENVIRONMENT FROM MULTIPLE IMMUTABLE FILE SYSTEM IMAGES

RELATED APPLICATION

This application is related to the subject matter disclosed in U.S. patent application Ser. No. 12/035,154 filed on Feb. 21, 2008 for "Dynamic Transactional Instantiation of System Configuration Using a Virtual File System" and U.S. patent application Ser. No. 12/035,102 filed on Feb. 21, 2008 for "Pluggable Extensions to Virtual Machine Monitors", both of which are co-assigned to Sun Microsystems, Inc., assignee of the present invention, the disclosures of which are herein specifically incorporated by this reference.

BACKGROUND OF THE INVENTION

1. Field of the Invention

Embodiments of the present invention relate, in general, to systems and methods for software distribution and particularly to dynamic composition of a virtual file system tree from multiple read-only file system images representing multiple software components.

2. Relevant Background

Computers pervade today's society as most consumer electronic devices include a small embedded computer. Cell phones, digital video device players, personal digital assistants, home wireless routers, cable set-top boxes and televisions all possess a computer of some sort. While each of these consumer products possesses a processor, memory and some form of a storage medium, consumer devices operate differently than the typical laptop or desktop computer.

Small consumer devices are typically firmware driven. This means that the device operates using software that comes in the form of a single opaque image (firmware); once downloaded, the software is ready to run. If upgrades exist, they can be downloaded from the vendor as a completely new image. Turn the machine off and back on and the new version essentially replaces the old version and runs perfectly. Typically, if one possessed the capability, one could extract a version of firmware from one machine, a cell phone for example, and load it into another without fear that it would not operate. Consumer devices have long followed the path that, with respect to code operating the device, a single, identical image is used for all machines.

This is not the case for laptops, desktops and other general application computers. A personal computer ("PC") is designed to offer a very flexible computing environment. While many users may desire to use Microsoft Windows, one user may wish to use Intuit's Quicken while another user prefers Microsoft Money. The firmware model described above would not allow for this type of flexibility. Consumer electronic devices have the advantage of having very specialized functions. Despite the versatilities of a cell phone, its functions are relatively limited compared to a laptop. As a result, the installation of software in a PC has evolved into a very complicated process. Typically a run-time software environment for a PC is not one file but a system of files (file system). Software components such as an operating system or applications, which typically comprise multiple files, are distributed in the form of packages containing all the files of which the software component consists. A separate program, the installer, extracts data from the files and places them on the hard drive of the PC. The installed files are very different from the image on the original software file.

Currently, operating systems on PCs, servers and the like create a file system tree to organize files. The file system tree contains numerous directories. When additional software is installed, such as Adobe Acrobat, certain files of a specific type are added to the existing directories. The new software does not create an entirely new directory tree, but, rather, augments the existing tree. For example, when Adobe installs additional drivers to ensure the functionality of the Adobe product, those drivers are placed in the directory in which Windows expects drivers to exist. For example, dynamic loadable libraries, DLLs, cannot be placed anywhere, they must reside in particular directories. In a similar manner, software is developed and installed so as to look for particular files in particular locations. In some cases, software developers rely on the fact that another application has already established the presence of a particular file in the directory and therefore does not include it in the software but simply directs its application. As you might expect, several directories become common for several separate applications. This explains why some software requires the presence of another and why an installation of one software, when it overwrites a particular file, may render another inoperable.

In a consumer electronic device such as a cell phone, the upgrade of the software image (firmware) running the cell phone typically does not alter configuration (customization) settings. This is because the configuration settings and the software image (firmware) are stored in physically separate portions of the device, and when the software image (firmware) is overwritten with a new one, the configuration settings remain intact. In a PC, configuration (customization) settings are also kept separately from the originally installed software, but this separation is logical rather than physical. This means that the software components (operating system and applications) store configuration (customization) settings in separate files, keeping the files that comprise the originally installed software intact. Thus, the configuration (customization) settings are not altered by individual software components upgrades. However, recall that the files containing configuration (customization) settings are stored in the same file system as the software components files. Therefore, when one attempts to upgrade the system by replacing an entire file system (for example by overwriting the entire file system image), then configuration settings are lost.

Most of the files that are created on a computer system's storage during an installation do not depend on any one system. The distinction in these files as compared to each other is confined to a small number of configuration files that generally occupy less that 0.1% of the stored files. Thus, if one can identify all the files containing configuration (customization) settings, these files can be easily extracted from a file system, and the file system can be replaced as in a firmware example. However, this approach lacks flexibility and it is limited by its inability to allow further composition.

SUMMARY OF THE INVENTION

The present invention discloses a system and method for the dynamic (run-time) composition of immutable file system images containing software components into a single file system and execution of software from the newly composed file system. A file system tree comprising a software distribution is divided into a plurality of mutually exclusive sub-trees. Each of these sub-trees contains individual software components that make up the software distribution. Immutable file system images are formed for each of these sub-trees. Each immutable file system image includes the file structure of the individual software component. According to one embodiment of the present invention, a virtual file system (also referred to herein as a virtualization data structure) is formed and configured to enable the dynamic composition of immutable file system images so as to form a virtual system tree that resembles the original software distribution. The virtual system tree is formed without extracting and copying files from the immutable images, but rather by combining the immutable images.

According to another embodiment of the present invention, the system includes at least a first and second immutable file system image. These two or more images make up an immutable file system image of a software application, distribution, or the like. When the system is powered on, the operating system kernel is loaded into memory, and the kernel establishes an initial root file system wherein the first immutable file system image and the second immutable file system image are mounted to independent directories of the initial root file system. Thereafter the virtual file system that creates a virtual directory is established. This virtual directory includes a virtual file for each of the immutable file system images. These virtual files include addresses or directions to access the immutable file system images. Once the virtual file system is formed, the root file system is replaced with the virtual file system and the normal boot process continues. Thereafter the software application in its original immutable form can be generated by accessing and combining, according to a rule set, the appropriate virtual files in the virtual file system. While the computer system maintains the file system images in immutable form, the virtual files of the virtual file system can be altered and replaced so as to form new compositions of the immutable file system images.

Another advantage of the present invention, according to one embodiment, is the ability to virtually alter otherwise immutable files. A memory or storage space is used to house a copy of the immutable file. In this space the virtual file system stores modification to virtualized read-only files while the immutable files remain intact. Once modifications are complete, the entire immutable file can be replaced.

According to another method embodiment of the present invention, the kernel of an operating system in a computer begins the booting process and establishes a root file system. Once established, each of a plurality of immutable file system images is attached to an independent directory of the root file system prior to attaching other file systems. The plurality of immutable file system images corresponds, in one embodiment, to a plurality of file system sub-trees. Each sub-tree comprises a software component. These software components, when combined, form a complete and consistent software distribution or application environment. A virtualization engine thereafter creates a virtualization data structure corresponding to an empty virtual file system tree. The virtualization engine then examines each of the plurality of immutable file system images to identify one or more mutual directories common to two or more of the plurality of immutable file system images. Each of the mutual directories includes a separate entry from each of the two or more file system images. Within the virtualization data structure is created a virtual directory corresponding to each immutable file system image including the mutual file system image directory. This virtual mutual directory includes a virtual entry for each separate entry in the mutual directory of both images and an actual location identifier for each separate entry within the file system image.

The virtual file system then replaces the root file system to create a file system directory possessing not only a plurality of file system images on independent directories and a virtual mutual file system housing information about common directories between the file system images, but a traditional read/write file system directory populated with other existing file systems. A virtualization engine thereafter accesses various immutable file system images by combining virtual entries in the virtualization data structure. Original compositions of immutable software based on combined file system images, such as a software distribution, can be accessed by accessing the virtual file structure. In addition new compositions of file system images can be achieved by updating and replacing existing virtual entries in the virtualization data structure. This updating and replacement of virtual entries can occur during normal operation of the computer system and without the need to recreate the existing file structure.

Functionally, when an arbitrary application executes a system call to the operating system kernel to open a file or a directory, and read or write its content, the virtual file system program uses the virtualization data structure to locate the relevant file and access its data. Once the virtual file system in the operating system kernel is initialized with the virtualization data structure, it replaces the original root file system.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; the claims will identify such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION OF THE PREFERRED EMBODIMENTS

The dynamic (run-time) composition and execution of immutable file system images into a single file system is described herein. Embodiments of the present invention enable the dynamic composition of immutable file systems while maintaining the flexibility offered by shared directories. According to the present invention, a virtual file system is established shortly after the formation of the root file system in the early stages of the booting process. Before the entire file system is established, a virtual file system is formed that places a plurality of immutable file system images on independent portions of the file system tree. These immutable file system images contain software components that can be combined to form a complete and consistent software distribution or application environment. Entries corresponding to each of the immutable file system images are placed in the virtual file system. In addition, directories common to the immutable images are identified resulting in the creation of one or more virtual mutual directories in which virtual representations of the entries found in each respective immutable image are placed. Each entry in the virtual file system provides a path or direction to the location of the corresponding file in one of the immutable file system images or to the location in the space used by the virtual file system for storing modifications (mutations) holding the modified (mutated) version of the file. The virtualization data structure can hold a generic or more general indirection rule(s), and each of these rules can tell the virtual file system how to locate, and in one embodiment combine, multiple files (e.g., an entire sub-tree of files and directories).

According to one aspect of the present invention, a virtualization engine assembles the appearance of an undivided immutable file system image by accessing various combinations of the virtual entries. The file system tree of a software distribution constructed through a composition of images using the virtual file system has the same appearance (layout) as if the software components comprising the distribution were installed in a single (undivided) file system. The virtualization engine can create new combinations of file system images by altering the combination of virtual entries with confidence that the original file system image remains immutable. In addition the virtual entries providing paths to the immutable file system images can be updated and replaced while the file system remains intact, i.e., while the computer system remains running.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Figure 1:
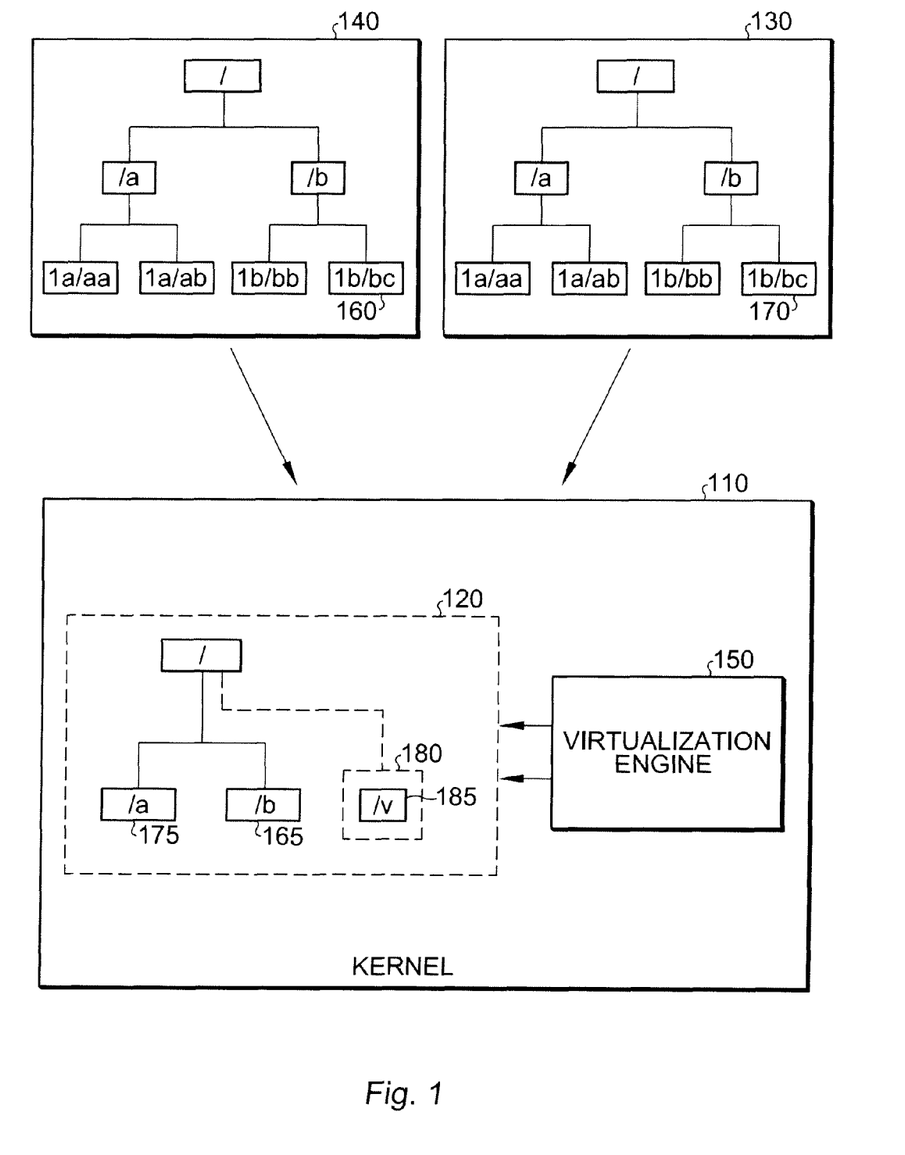
FIG. 1 shows a high level block diagram of one embodiment of a system for the dynamic (run-time) composition of immutable file system images in a single virtual file system, and execution of software from within this virtual file system, according to the present invention.

FIG. 1 is a high level block diagram showing one embodiment of a system for the dynamic (run-time) composition of immutable file system images, each containing software components, into a single file system and execution of software from the composed file system of immutable file system images according to the present invention. During the early boot phase of a machine, the kernel 110 creates a root file directory 120 on which subsequent files can reside. Furthermore, physical devices are identified and the basics of the operating system become operational. Prior to inclusion of other existing file systems, a virtualization engine 150 intercedes in the root file system construction and mounts or attaches a plurality of immutable file system images 130, 140, each possessing a plurality of file entries, to independent directories 165, 175 (respectively) of the root file directory 120. Prior to attaching these file system images 160, 170 the integrity and authenticity of each image is verified.

As shown in FIG. 1, the top level directories in each of the images are represented by the symbol "/". This is commonly known in the art as the root directory. The root directory of a file system can be mounted (attached) to any subdirectory that creates a logical link between this attached subdirectory and the root directory of a mounted file system. The very top-most file system whose root directory is not mounted to any other file system is referred to as the root file system. Thus the root file system is merely a pointer to one of a plurality of other file systems. According to one embodiment of the present invention, after the virtual file system of the present invention is fully initialized, the existing root file system is switched to the newly created virtual file system making the virtual file system the top-most file system.

According to the present invention the process of composing the virtual file system is driven by the virtualization engine 150. The virtualization engine 150 is, according to one embodiment of the present invention, a computer program that can create a virtualization data structure. The virtualization engine may be resident inside or outside of the confines of the kernel depending on its particular implementation.

As can be appreciated by one skilled in the art, software contained with each immutable file system image is in an installed form. Rather than having to modify the data contained within the image to operate on the machine, the image is self-contained. Furthermore the image is read-only. The integrity of the image can be verified via a digital signature of other means known to one skilled in cryptography. For example, using a private and public key pair, the integrity of the contents of the image can be verified by a trusted source such as the vendor of the file system image. As the immutable image is read-only, once added to the system, the user can be confident that it does not contain a virus or other malicious computer code.

According to one aspect of the present invention, each immutable file system image corresponds to a separate sub-tree of a larger file system tree. Each sub-tree represents a software component of a larger software distribution, i.e., the larger file system tree. Each software component, and thus each sub-tree, is mutually exclusive. The immutable file system image is thus a read-only file having a file structure of a corresponding software component. Taken collectively, the immutable file system images represent the larger file system tree (software distribution) in the form of an immutable file system image.

According to one embodiment of the present invention, the virtualization engine 150 dynamically forms a virtual file system 180 that combines various virtual entries representing immutable file system images 130, 140 to form, what appears to be, an original software distribution. Unlike the prior art, the formation of the software distribution is done without any mutation of the original software components.

The virtualization engine 150 further forms a virtualization data structure 180 as a read-only file system. This virtual file system 180 is empty in that it contains no actual file system image entries. Having the immutable file system image 130, 140 mounted to the initial root file system 120, the virtualization engine 150 examines each entry within each immutable file system image 130, 140 for common directories. For example, each file system image likely contains several file system image directories having pathnames that are unique to that file system image. However, as previously described, several directories may be common to both file system images. By convention, during a typical installation process certain files, for example plug-ins, dynamically linked libraries or common executable programs are placed in directories with well known pathnames (e.g./usr/lib/plugins, /usr/lib, /bin), where they can be easily located by other software components. All library files are, for example, typically placed in the common directory designated for the library files.

According to one embodiment of the present invention, the virtualization engine 150 identifies these directories with identical pathnames 160, 170 and, based on this commonality, forms a mutual or common virtual directory 185 in a virtualization data structure 180. Recall that the virtualization data structure 180 is void of any file entry data. The virtualization engine instead adds directions or path instructions providing an entity trying to access a file the correct address to the corresponding immutable file system image. For example, assume that both immutable file system images 160, 170 possess driver entries located in a driver directory. While both of these file system images have driver entries, and both are associated with a driver directory, they are, nonetheless, different. Normally these entries would be installed in the operating system's driver directory apart from the original file system image.

According to the present invention, each of the file system images may contain directory /usr/lib/plugins, designated for pluggable modules. Each file system image may have a plurality of files or sub-directories in /usr/lib/plugins unique to a given image. For each of these files or sub-directory entries, a virtual entry is created in the /usr/lib/plugins directory of the virtual file system.

Once all of the immutable file system images 130, 140 mounted have been examined for directory commonalties (commonalities of directory pathnames), the virtualization engine 150 replaces the existing root file system that includes the immutable file system images with the virtual file system 180 that possesses the virtual mutual directories making the virtual file system 180 the top-most file system. Thus the resulting new root file system is, in essence, the virtual file system 180.

Figure 2:
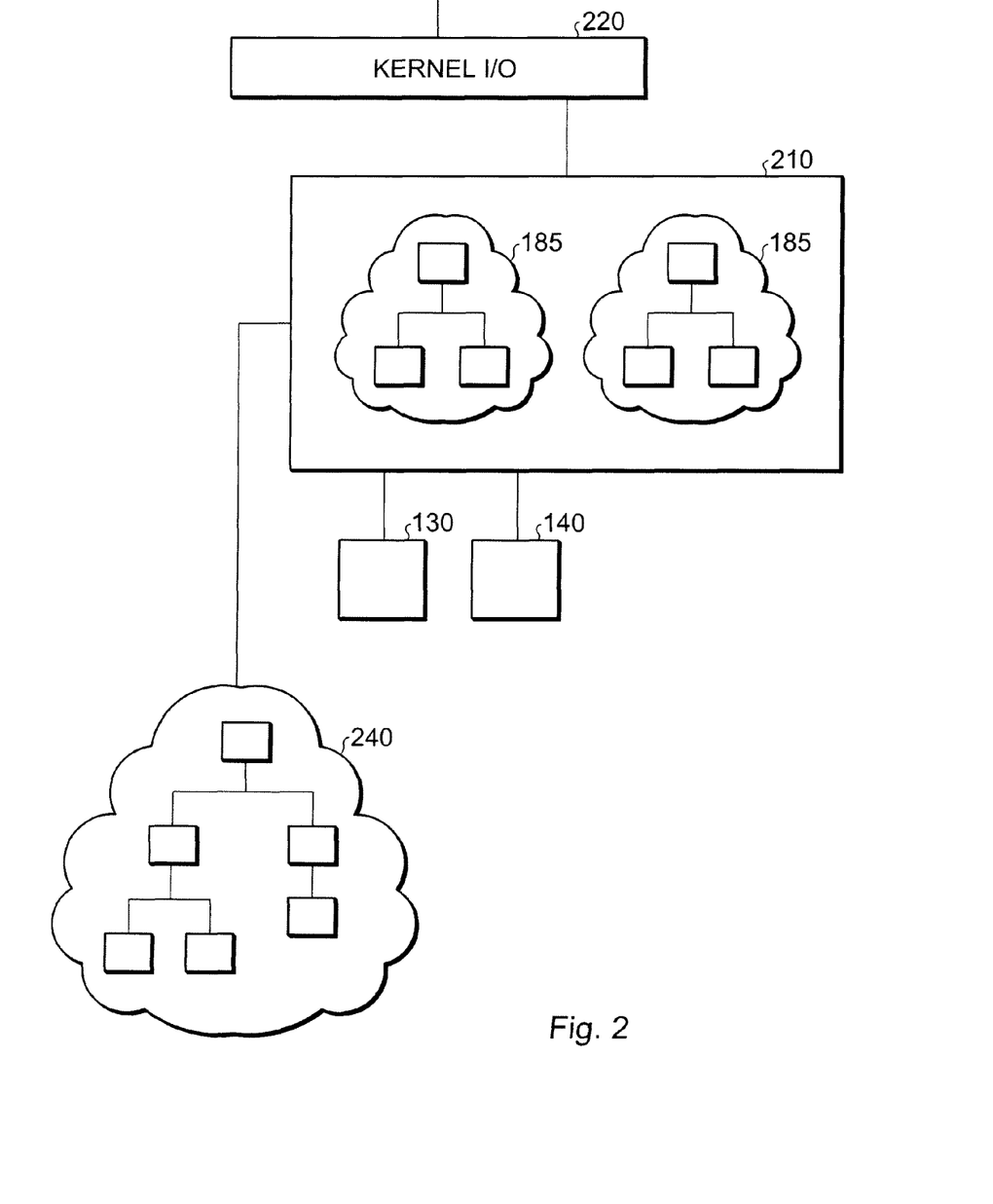
FIG. 2 shows a high level block diagram of a virtual file system directory for the distribution and execution of immutable file system images, according to one embodiment of the present invention.

FIG. 2 shows, according to one embodiment of the present invention, the virtual file system layer 210, which is interposed between the kernel I/O system calls layer 220 and the immutable file system images 130, 140. The virtual file system layer 210 provides the kernel I/O system calls layer 220 with an appearance (abstraction) of the traditional file system tree. The resulting file structure includes immutable file system images 130, 140 that remain in their original pristine form and one or more mutual virtual directories 185. Each of these virtual directories 185 provides information to locate within an immutable file system image 130, 140 an entry that is associated with an immutable file system image.

With the virtual file system 210 occupying the top-most place of the root file system, the boot continues. Other read-write file systems 240 typically can be mounted (attached) to any empty leaf of the virtual file system. I/O system calls to these file systems will not be handled by the virtual file system.

According to another embodiment of the present invention, the virtual file system 210 can be modified to hold modified file data. An attempt to modify data in an immutable file image can cause the creation of a modified data file in the virtual file system. The modified data can be either stored in machine memory or in persistent storage (disk or flash memory) for later use.

One aspect of the present invention is the invention's ability to dynamically impose a virtual file system of immutable file images representing, in one case, a software distribution. By dividing a file system tree containing a software distribution into a plurality of sub-trees, and representing each of these sub-trees as an immutable file image, the present invention can combine immutable file images so as to resemble the original software distribution without fear that any of the software components have been altered. According to this aspect of the present invention, each sub-tree comprises a mutually exclusive software component of the larger file system tree. Each immutable file system image thus possesses a file system structure for each software component of the larger file system tree. The virtual file system can dynamically construct the file system structures found in a plurality of immutable file system images so as to resemble the original software distribution while eliminating any mutation (copying or extracting) of the original files.

Another advantage of the present invention is that multiple combinations of the same file system images can be used to construct different virtual software installations without any changes of the images. For example assume that the first file system image contains a version of Solaris operating system, the second image contains a version of Oracle database, and the third image contains a version of Java Development Kit. Using a combination of first and second images one can construct a virtual software installation of Solaris with an Oracle database, etc, etc. Common directories are identified and mapped to the newly created virtual file system. Recognizing the addition of Java to the file system tree, the virtualization engine 150 creates new virtual entries into the virtual file system. Old entries in the virtual file system that reflected only the existence of Solaris and Oracle can be replaced to reflect the new combination of Solaris, Oracle and Java. The replacement of virtual files, the virtual file entries and the path directions to the immutable file system images can occur while the system is running. The process is as simple as adding a new or modified file system image and replacing old virtual file entries with new updated virtual file entries.

Figure 3:
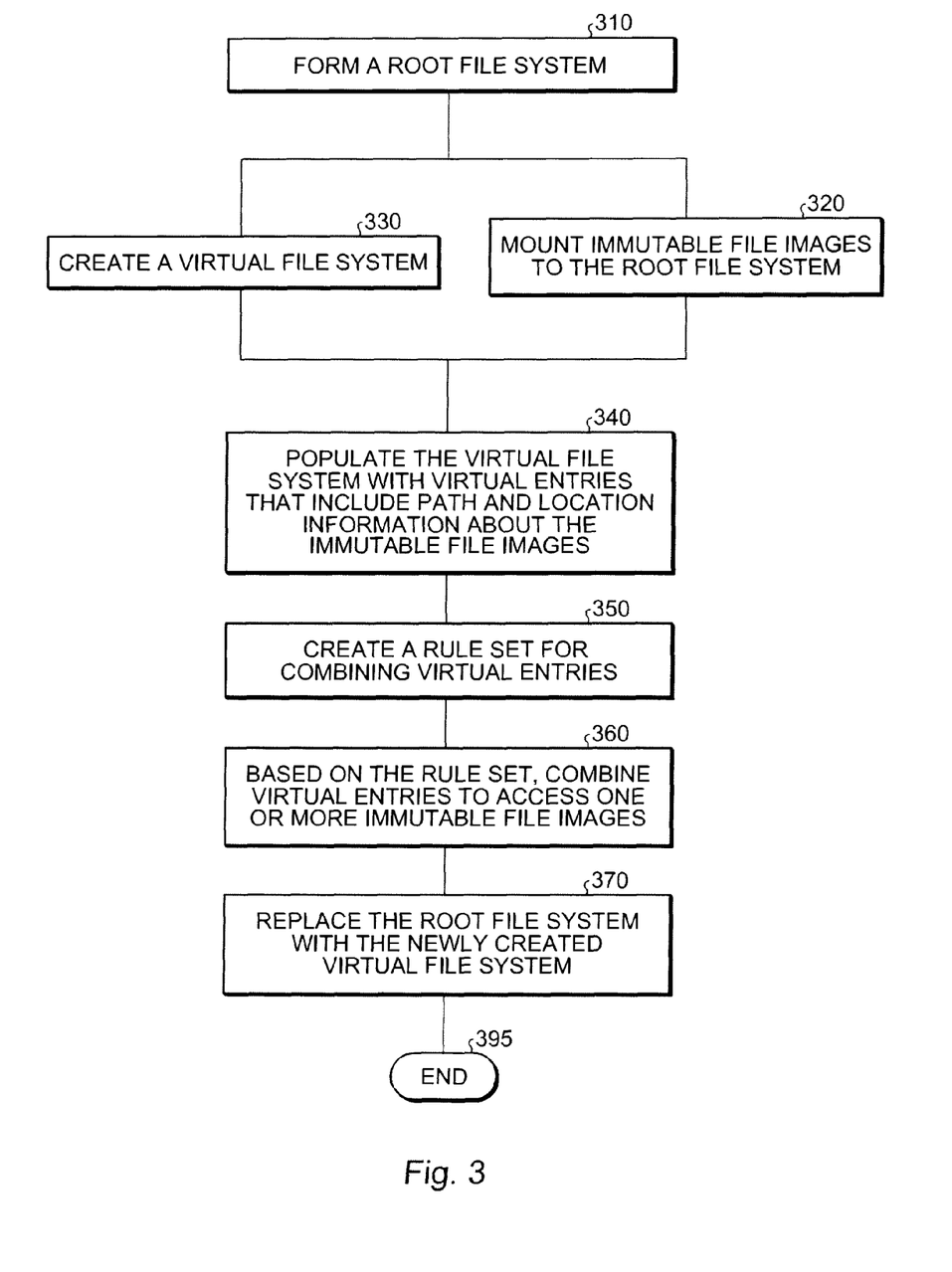
FIG. 3 is a flowchart of one method embodiment for the composition of immutable file system images using a virtual file system, according to the present invention.

FIG. 3 is a high level flowchart of one method embodiment for the composition of a virtual file system tree and execution of software from this virtual file system tree of immutable file system images using a virtual file system, according to the present invention. After an initial root file system is formed 310 two or more immutable file system images are mounted 320 to independent branches of the root file system. The immutable file system image can be portions of a larger software file system image such as an application, software distribution or operating system. Each portion or file system image is read-only and is mounted in its installed form. Once the immutable file system images are mounted, a virtual file system is created 330. The virtualization engine 150 thereafter populates 340 the virtual file system with virtual entries. Each virtual entry represents a corresponding entry of the immutable file system image. The virtual file entries are, however, data free. Instead of possessing data the virtual entries include path and location information to reach the associated immutable file system image.

The virtualization engine 150 further creates 350 a rule set governing access to the immutable file system images via the virtual entries. Based on this rule set, various virtual entries can be combined 360 to provide access to corresponding immutable file system images. In that manner an application, software distribution or the like, formed by the correct combination of immutable file system images, can be accessed. Thus a single rule can provide location information or directions between a set (plurality) of virtual file entries and the corresponding file entries in the file system images.

Another advantage of the present invention is the ability to update and replace 370 the virtual entries. In this manner new immutable file system images can be loaded into the system, and, once the virtual entry is replaced, any subsequent combination will access the new version of the file system image.

To more clearly demonstrate the advantages of the present invention consider the following example. Assume a computer system exists with an operating system and several different software applications. According to the present invention, each software application is divided into multiple immutable file system images. Each of these file system images is mounted to the file directory, and a corresponding virtual entry is created to represent each immutable file. When the computer system seeks to access a certain program, it is directed toward the virtual file system entries. These entries redirect the computer system to the correct combination of immutable file system images. Since the file system images are read-only, the user is assured that the software is authentic and has not been altered. Periodically updates to the software occur. While in many systems an installation process requiring the shutdown and rebooting of a system is not an inconvenience, some systems are designed for continuous, 24/7 operation. A shutdown and reboot for a simple software update can have significant revenue and system integrity implications.

According to the present invention, the new software update is divided into immutable file system images and added to an independent directory of the existing file system. This can be done while the system continues to operate using the old software. While both the new and old software exist on the system, the virtual entries only direct access to the old software. Once the new immutable file system images have been mounted to the system, the virtualization engine creates new, updated virtual entries having path and location information about the new immutable file system images. Once the virtual file system images are in place, the virtualization file system image can, based on certain pre-established rules, replace the existing virtual entries for this particular combination of immutable file system images. For example, the virtualization engine can monitor access to the immutable file system images, and, upon identifying a period of non-use, replace the old virtual entries with updated entries. Upon sought access to the software, the new virtual entries will be in place and direct the system to the newly updated and added immutable file system images. The system can thereafter remove the old immutable file system images at its convenience.

Figure 4:
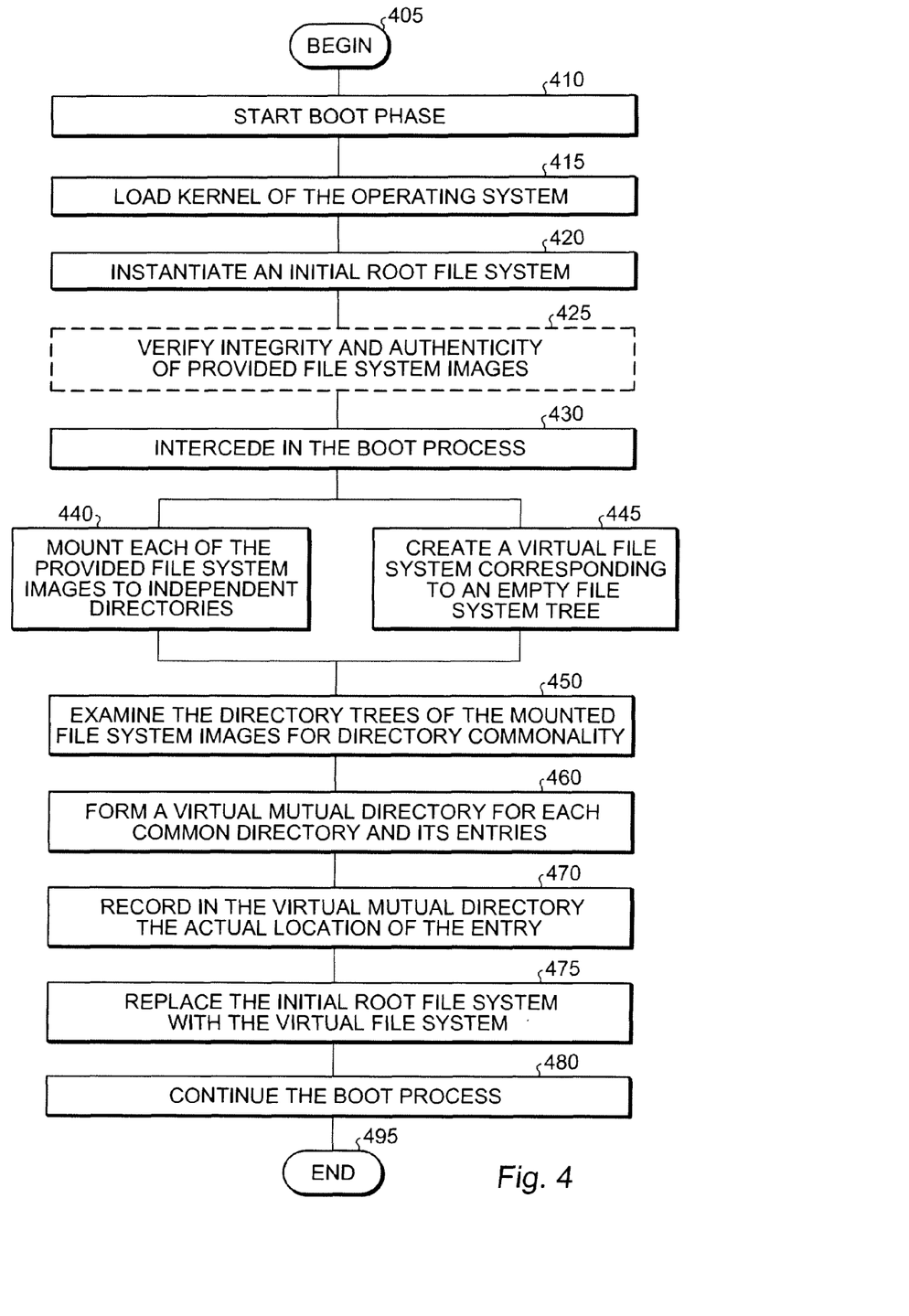
FIG. 4 is a flowchart of one method embodiment for the execution of software from within a virtual file system created through a file level composition of immutable file system images, according to the present invention.

FIG. 4 is a flowchart of one method embodiment for composing and executing immutable file system images on a machine using a virtual file system, according to the present invention. The process begins 405 with the start of the normal boot process 410 of the operating system. The kernel is loaded 415 from persistent memory and instantiates 420, a fundamental or initial root file system.

FIGS. 3 and 4 are flowcharts illustrating an exemplary method to compose and execute a plurality of immutable file system images. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or in the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one embodiment of the present invention, the virtualization engine 150 verifies 425, the integrity, authenticity and dependencies of one or more file system images, and thereafter pauses 430, or interrupts the boot process. With the boot process interrupted, the file system images are each mounted 440 to independent directories of the initial root file system. Thereafter a virtual file system 185 is created 445 that corresponds to an empty file system tree.

The virtualization engine 150 traverses or examines 450 each file system image for common directories. Upon finding such a directory commonality, the virtualization engine 150 forms 460, a virtual mutual directory corresponding to each common directory found in the file system images. Each virtual mutual directory is populated with a record 470 of the actual locations of the entries that are associated with a common directory yet reside in the separate file system images.

Once the virtual file system is formed with a variety of virtual mutual directories, the initial root file system is replaced 475 with the virtual file system 185. As one skilled in the art will appreciate, the actual replacement or merging of the virtual file system with the existing, yet basic, root file system may be accomplished in a single step or over several stages according to the particular operating system in which the present invention is implemented.

The resulting replacement of the root file system and the virtual file system results in a file system tree that includes immutable portions, such as the file system images and the virtual mutual directories, as well as additional branches for mounting of existing mutable file structures.

With the virtual file systems in place, the boot process continues 480 and other existing file structures are added, ending the process 495. One advantage of the present invention is the ability to flexibly alter the composition of immutable file system images in an operating system. Since the existing file system images are immutable, they cannot be altered during normal operations. According to one embodiment of the present invention, a new file system image, be it an upgrade, modification or completely new file system image, is added to memory during operations of the existing operating system. The operating system is thereafter rebooted. During the reboot the new file system image is identified as an existing file system image, just as the preexisting file system images are identified. Each time the boot takes place, each and every file system image is identified and mounted to an independent directory of the root file system. As the invention continues, the relationships between the new file system image and the other pre-existing file system images are formed, and a new operating system environment is formed. Thus, the addition, alteration or deletion of file system images is efficient and flexible.

Another advantage of the present invention is that the modifications to the immutable files are confined to the virtual data structure. Should the data structure be deleted, damaged or removed, the system can be reinitialized with its appearance as it existed prior to the modifications. Furthermore the modifications can be preserved, or logged, to establish a history of modifications.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A method for the execution of immutable file system images on a computer system, the method comprising:
    establishing a root file system;
    forming a plurality of immutable file system images wherein each of the plurality of immutable file system images is associated with a mutually exclusive sub-tree of a file system tree;
    attaching each of a plurality of immutable file system images to an independent directory of the root file system prior to attaching other file systems to the root file system;
    generating a virtualization data structure corresponding to an empty file system tree;
    creating at run-time, in the virtualization data structure, a virtual directory including a virtual entry for each of the plurality of immutable file system images wherein each virtual entry includes file system structure of the mutually exclusive sub-tree; and
    joining functionally at run-time two or more of the plurality of immutable file system images by combining the virtual entries for each of the two or more of the plurality of immutable file system images.

2. The method of claim 1 wherein root file system establishment is halted prior to mounting of any existing file systems.

3. The method of claim 1 further comprising examining each of the plurality of immutable file system images to identify a mutual directory common to two or more of the plurality of immutable file system images wherein the mutual directory includes a separate entry from each of the two or more of the plurality of immutable file system images.

4. The method of claim 1 wherein authenticity of each of the plurality of immutable file system images can be verified prior to attaching.

5. The method of claim 1 further comprising writing to a memory an actual location identifier for each virtual entry of the virtual directory.

6. The method of claim 5 wherein the actual location identifier for each virtual entry of the virtual directory can be replaced while the computer system is running.

7. The method of claim 6 wherein the virtualization data structure is accessible via a virtual file system ("VFS") application programming interface ("API") and wherein the VFS API determines entry locations using the actual location identifier.

8. The method of claim 5 further comprising regenerating the virtualization data structure when a valid attempt to modify at least one of the separate entries in the virtual directory is received.

9. The method of claim 1 wherein the file system tree includes a software distribution.

10. The method of claim 9 wherein combining the virtual entries of the two or more of the plurality of immutable file system images functionally recreates the software distribution.

11. A system for providing a virtual file system tree for dynamic composition of a plurality of read-only file system images containing software in pre-installed form operable in a machine capable of executing instructions embodied as software, the system comprising:
    a hardware processor running an operating system having an initial root file system tree in memory accessible by the hardware processor; and
    a plurality of software portions selectively executable by the hardware processor, wherein
    one of said software portions is configured to cause the system to mount each of the plurality of read-only file system images under an independent directory of the initial root file system;
    one of said software portions is configured to cause the system to create a virtual file system tree separate from the initial root file system tree;
    one of said software portions is configured to cause the system to form as part of the virtual file system tree a mutual directory wherein the mutual directory includes a virtual file having a path to each of the plurality of read-only file system images; and
    one of said software portions configured to cause the system to replace at least one of the virtual files while the operating system is running.

12. The system of claim 11, further comprising responsive to replacing the initial root file system with the virtual file system tree, mounting additional read-write file system trees to the virtual file system tree.

13. The system of claim 11 wherein one of said software portions is configured to form a read-only file system image by combining a plurality of virtual files.

* * * * *